(12) United States Patent
Arora

(10) Patent No.: US 7,689,099 B2
(45) Date of Patent: Mar. 30, 2010

(54) METHOD AND APPARATUS FOR PROGRAMMING THE PLAYBACK OF PROGRAM INFORMATION

(75) Inventor: Jitesh Arora, Thornhill (CA)

(73) Assignee: ATI Technologies ULC, Markham, Ontario (CA)

(*) Notice: Subject to any disclaimer, the term of this patent is extended or adjusted under 35 U.S.C. 154(b) by 1553 days.

(21) Appl. No.: 10/965,648

(22) Filed: Oct. 14, 2004

(65) Prior Publication Data

US 2006/0083482 A1    Apr. 20, 2006

(51) Int. Cl.
    *H04N 5/91* (2006.01)
(52) U.S. Cl. .......................................... 386/83; 386/95
(58) Field of Classification Search ............... 386/46, 386/68, 83, 95, 125, 126
    See application file for complete search history.

(56) References Cited

U.S. PATENT DOCUMENTS

| | | | |
|---|---|---|---|
| 5,390,027 A * | 2/1995 | Henmi et al. ............... | 386/65 |
| 6,483,986 B1 | 11/2002 | Krapf | |
| 6,499,029 B1 | 12/2002 | Kurapati et al. | |
| 6,760,535 B1 | 7/2004 | Orr | |
| 7,369,749 B2 * | 5/2008 | Ichioka et al. ............... | 386/83 |
| 2002/0080277 A1 * | 6/2002 | Kida et al. ................... | 348/553 |
| 2003/0093790 A1 | 5/2003 | Logan et al. | |
| 2003/0118321 A1 | 6/2003 | Sparrell et al. | |
| 2003/0202773 A1 | 10/2003 | Dow et al. | |
| 2003/0210889 A1 | 11/2003 | Engle et al. | |
| 2004/0095377 A1 | 5/2004 | Salandro | |

OTHER PUBLICATIONS

"Co-pending U.S. Appl. No. 10/864,019, filed Jun. 9, 2004, Anton Komar."

* cited by examiner

*Primary Examiner*—Huy T Nguyen
(74) *Attorney, Agent, or Firm*—Vedder Price P.C.

(57) ABSTRACT

A program information player automatically skips over any intermediate channel changes as a result of interrupting a prior recording of a selected program. The program information player includes a program sequence playback information generator. The program sequence playback information generator analyzes selected program identifier information and recorded program history log information and, in response, generates program sequence playback information without user intervention. The program sequence playback information includes a sequence of time stamp information associated with the selected program identifier information. According to one embodiment, the program sequence playback information directs memory to play back the selected program corresponding to the selected program identifier information by, for example, skipping over any intermediate channel changes. For example, the program sequence playback information may represent a read pointer in memory during playback.

14 Claims, 5 Drawing Sheets

| PROGRAM IDENTIFIER TAG INFORMATION 510 | CHANNEL INFORMATION 520 | TIME STAMP INFORMATION 530 | | |
|---|---|---|---|---|
| | | START DATE | START TIME | DURATION |
| PROGRAM N | 5 | 06.25.2004 | 7:00:00 | 0:25:00 |
| PROGRAM N+1 | 7 | 06.25.2004 | 7:25:00 | 0:05:00 |
| PROGRAM N+2 | 9 | 06:25:2004 | 7:30:00 | 0:05:00 |
| PROGRAM N+3 | 32 | 06.25.2004 | 7:35:00 | 0:02:15 |
| PROGRAM N | 5 | 06.25.2004 | 7:37:15 | 0:22:45 |
| PROGRAM N+4 | 11 | 06.25.2004 | 7:55:00 | 0:03:15 |
| PROGRAM N | 5 | 06.25.2004 | 7:58:15 | 0:01:45 |

RECORDED PROGRAM HISTORY LOG INFORMATION 40

| | | | |
|---|---|---|---|
| PROGRAM N | 06.25.2004 | 7:00:00 | 0:25:00 |
| PROGRAM N | 06.25.2004 | 7:37:15 | 0:22:45 |
| PROGRAM N | 06.25.2004 | 7:58:15 | 0:01:45 |

PROGRAM SEQUENCE PLAYBACK INFORMATION 50

FIG. 5

METHOD AND APPARATUS FOR PROGRAMMING THE PLAYBACK OF PROGRAM INFORMATION

FIELD OF THE INVENTION

The invention relates to the recording and playback of program information, and more specifically to programming the recording and playback of program information.

BACKGROUND OF THE INVENTION

The introduction of digital and analog video recorders has made time-shifting of video information, such as audio and video information, easy for many home entertainment system users. However, a user watching a program will typically change channels when a program interruption occurs, such as a commercial, to perform what is commonly known as "channel surfing". The video recorder continues to receive the program information and "records" the program information onto the video recorder. Program information may refer to any information, for example, received during a television broadcast. Program information may also include information received from the Internet or from a local database such as a CD-ROM. The video recorder records not only the program the user may be watching but also all the program interruptions, as well as all the portions of programs received during the channel changes also known as "channel surfing." As a result, when the user later plays back the recording, the video recorder plays back the program that the user viewed, the program interruptions and all the portions of programs as a result of the channel changes. Viewing the program interruptions and, in particular, the portions of programs viewed while changing channels may be undesirable to the user.

Time-shifting of video information allows a user to manually "pause" the reception of the video information by directing the video information to a video recorder while maintaining an instantaneous image of the video information on a television A/V receiver or other video device. The video recorder continues to receive the video information, and "records" the video content onto the digital video recorder. When the user later resumes viewing, the video recorder continues to receive video information and to record the video information onto the video recorder, but presents the video information from a point at which the user had paused the reception. In other words, the user plays video information that is delayed with respect to the video information being recorded. When the user later plays back the recording, the video recorder plays back the program that the user viewed, the program interruptions and all the portions of programs as a result of the channel changes.

According to one method, a digital video recorder includes two tuners, so that while one program is being recorded, another program may be viewed. However, incorporating two tuners into a digital video recorder increases the cost and complexity of the digital video recorder, and therefore is not as desirable as a digital video recorder having a single tuner.

According to another method, a digital video recorder receives electronic program guide information (EPG) during a television broadcast. The electronic program guide information may include broadcast scheduling information, such as the name or title of a program such as a show, the channel the program is broadcast on, the start time and the stop time. The electronic programming guide information may also include other types of information, such as genre (movies, game shows, educational, etc.), channel (NBC, CNN, MTV, etc.), actors (Al Pacino, Dustin Hoffman, Tom Cruise, etc.), and so on. Further, the electronic program guide information may include a narrative summary, various keywords categorizing the content and other suitable information. According to this method, the video recording device may record broadcast information identified by a particular title of a program, such as "Friends." However, according to this method, any intermediate channel changes are recorded so that when played back, all the intermediate channel changes are also played back.

According to another method, a video recorder is programmed to record an entire program, including all program interruptions. A review of the entire program is performed and program interruptions are marked, based on an estimate of the start of the program interruption and the anticipated length of the program interruption. Once the recording is marked, during playback, scenes that were previously marked are skipped. For example, a video cassette recorder may attempt to identify the start or end of a commercial by detecting changes in audio level. Typically, such methods incorrectly identify the start of a program, resulting in the failure to record a portion of the desired program. Further, these methods may miss the start of a program interruption, resulting in playing a program interruption and possibly skipping over the desired program. Additionally, the method requires recording of both the desired program and all the program interruptions, as well. Therefore, the storage space is wasted, and sufficient storage space is required in order to store all of the programs.

BRIEF DESCRIPTION OF THE DRAWINGS

The present invention is illustrated by way of example and not limitation of the accompanying figures, in which like-referenced numerals indicate similar elements and in which:

FIG. 5 is a graphical representation of recorded program history log information and program sequence playback information according to another exemplary embodiment of the invention.

DETAILED DESCRIPTION OF THE PREFERRED EMBODIMENTS

A program information player automatically skips over any intermediate channel changes as a result of interrupting a prior recording of a selected program. The program information player includes a program sequence playback information generator. The program sequence playback information generator analyzes selected program identifier information and recorded program history log information and, in response, generates program sequence playback information without user intervention. The program sequence playback information includes a sequence of time stamp information associated with the selected program identifier information. According to one embodiment, the program sequence playback information directs memory to play back the selected program corresponding to the selected program identifier information by, for example, skipping over any intermediate channel changes. For example, the program sequence playback information may control a read pointer in memory during playback.

Among other advantages, the program information player automatically identifies any intermediate channel changes while recording a selected program. For example, the user may enter the selected program desired for playback. Alternatively, the user may select from a list of programs recorded based on the first segment in the list of recorded programs or based on the segment with the most recording time. In response to receiving the selected program from the user, the program information player plays back a previously recorded program corresponding with the selected program without the intermediate channel changes originally recorded. Accordingly, a user playing back a previously recorded program may be able to enjoy the selected program without the intermediate channel changes originally recorded. As a result, the user does not have to manually fast-forward over the intermediate channel changes during playback, since the program information player automatically identifies the intermediate channel changes and resumes playback when recording returns to the selected program. According to another embodiment, the program information player may identify a scheduled replay or rerun of the selected program in order to record any portions of the selected program that were missed as a result of the user's changing channels during the recording of the selected program. Accordingly, the user may enjoy the playback of the selected program without having to search a TV listing such as an electronic program guide for a rebroadcast or rerun of the selected program. Further, the program information player can piece together segments of the same selected program aired at different times. Therefore, the user does not need to wait until the selected program airs again, nor is the user required to manually try to find the individual segments of the previously recorded program.

Figure 1:
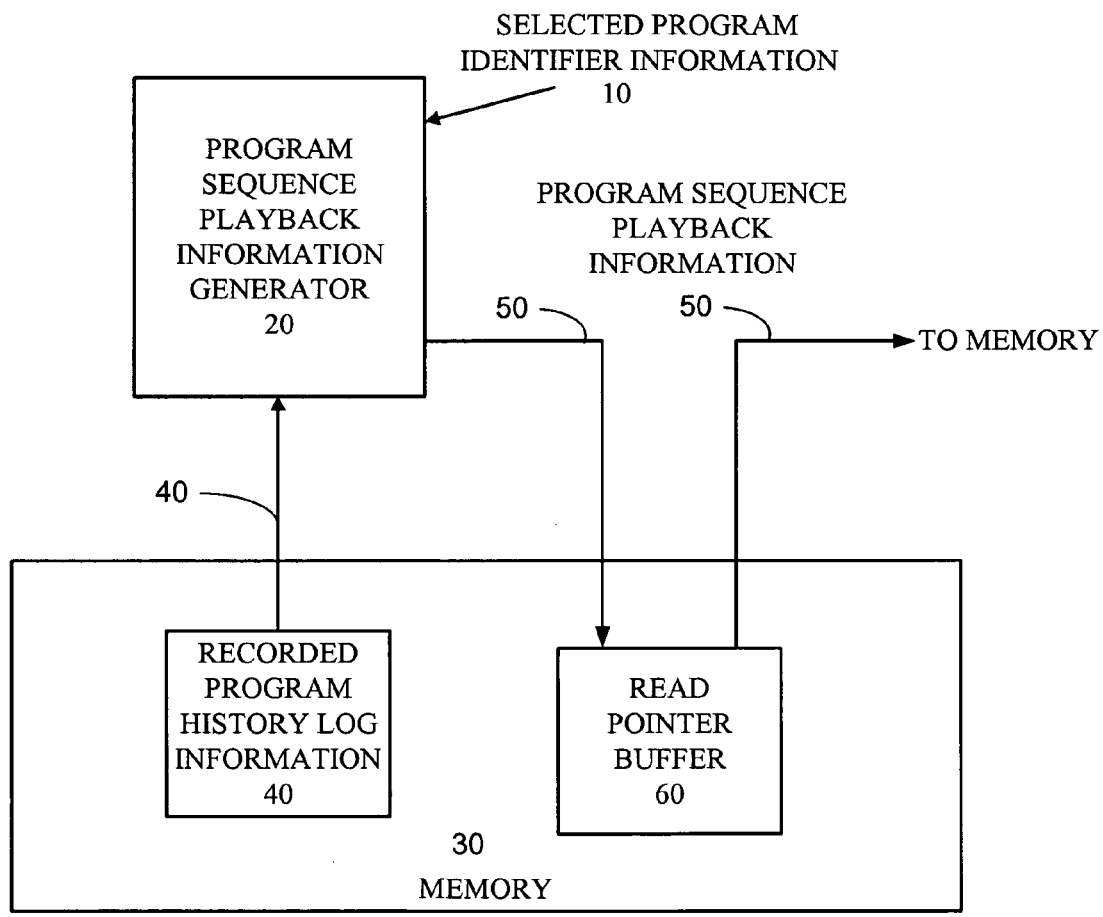
FIG. 1 is a block diagram of a program information player in accordance with one exemplary embodiment of the invention.

FIG. 1 is a block diagram of a program information player 100 including a program sequence playback information generator 20 and memory 30. The program sequence playback information generator 20 may be one or more suitably programmed processors, such as a microprocessor, a microcontroller or a digital signal processor (DSP), and therefore includes associated memory, such as memory 30, which contains instructions that when executed cause the program sequence playback information generator 20 to carry out the operations described herein. The program sequence playback information generator 20, as used herein, may include discrete logic state machines or any other suitable combination of hardware, software, middleware or firmware. The various elements of the program information player 100 are connected by a plurality of links. The links may be any suitable mechanisms for conveying electrical signals or data, as appropriate.

Memory 30 may store recorded program history log information 40 and program sequence playback information 50. The program sequence playback information 50 may be stored on a read pointer buffer 60. As will be described below, memory 30 may also store program information, such as, for example, analog or digital audio, text and video information from, for example, a cable, satellite or television broadcast or, for example, the Internet.

The memory 30 may be, for example, random access memory (RAM), read-only memory (ROM), optical memory or any suitable storage medium located locally or remotely, such as via a server or distributed memory, if desired. Additionally, the memory 30 may be accessible by a wireless base station, switching system or any suitable network element via the Internet, a wide area network (WAN), a local area network (LAN), a wireless wide access network (WWAN), a wireless local area network (WLAN) such as, but not limited to, an IEEE 802.11 wireless network, a Bluetooth® network, an infrared communication network, a satellite communication network or any suitable communication interface or network.

According to one embodiment, the program sequence playback information generator 20 may be part of a set-top box, an analog or digital video recorder, or any computer system or other suitable processor-based system. Additionally, the program sequence playback information generator 20 could also be implemented within the read pointer buffer 60, rather than a discrete component. The computer system or other processor-based system may include a central processing unit, video graphics circuitry, system memory and other suitable peripheral circuits. According to one embodiment, the central processing unit functions as a host processor while the video graphics circuitry (e.g., a graphics coprocessor) functions as a loosely coupled coprocessor. By way of example, the video graphics circuitry may be an integrated circuit on a single semiconductor die such as an application-specific integrated circuit (ASIC). Additionally, the video graphics circuitry may include memory, such as, but not limited to, dynamic random access memory (DRAM). This memory may reside on the same semiconductor die (ASIC) as the video graphics circuitry, or it may be separate and connected through board level or package-level traces.

According to one embodiment, the program sequence playback information generator may be part of the host processor or, alternatively, may be part of the video graphics circuitry. Similarly, memory 30 may be part of system memory, graphics memory, a hard drive or any other suitable memory. For example, the above-described operation may be implemented in a software program, such as an application or a driver program, executed by a host processor or any suitable processor.

Figure 2:
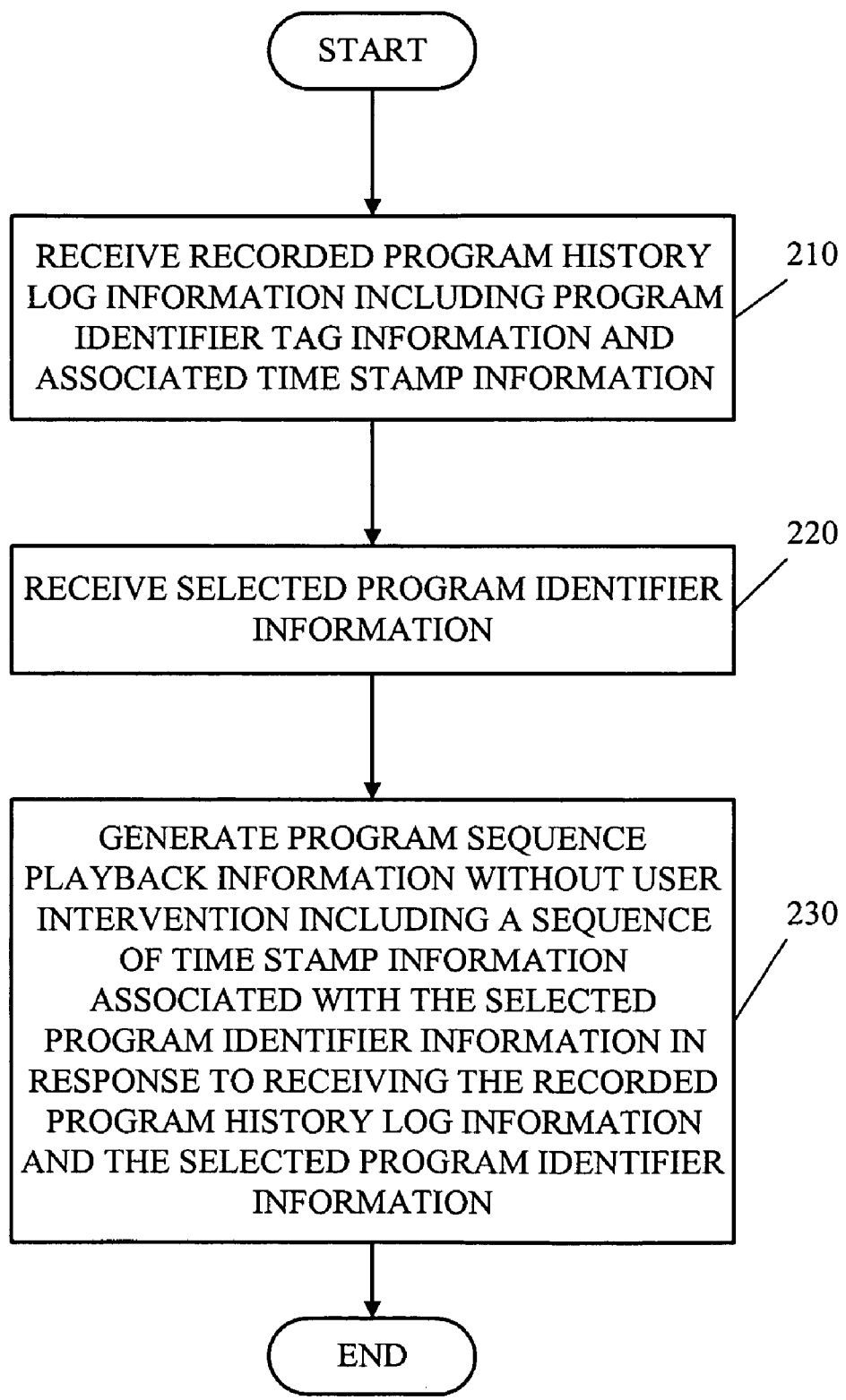
FIG. 2 is a flowchart illustrating one example of a method for the programming of program information according to one exemplary embodiment of the invention.

FIG. 2 illustrates a method for the programming of program information according to one embodiment of the invention. The method may be carried out by the program information player 100 or specifically by the program sequence playback information generator 20; however, any other suitable structure may also be used. It will be recognized that the method, beginning with step 210, will be described as a series of operations, but the operations may be performed in any suitable order and may repeat in any suitable combination.

As shown in step 210, the program sequence playback information generator 20 receives the recorded program history log information 40, including program identifier tag information 510 and associated time stamp information 530 (shown in FIG. 5). For example, the recorded program history log information 40 may include the name of a program, the title of a program or any suitable descriptor, such as a category, and associated time stamp information, which may relate to the start date, time and the duration of the program. The recorded program history log information 40 corresponds to a log of information of previously recorded programs.

As shown in step 220, the program sequence playback information generator 20 receives selected program identifier information 10. The selected program identifier information 10 may be provided by a user. The user may enter the selected program identifier information 10 for playback via a suitable user interface. Alternatively, the user may provide the selected program identifier information 10 by selecting from a list of programs recorded based on the first segment in the list of recorded programs or based on the segment with the most recording time. For example, the selected program information may correspond to the title, category or any other suitable descriptor for identifying a program.

As shown in step 230, the program sequence playback information generator 20 generates the program sequence playback information 50 without user intervention in response to receiving the recorded program history log information 40 and the selected program identifier information 10. The program sequence playback information 50 includes a sequence of time stamp information associated with the selected program identifier information 10. The program sequence playback information 50 directs memory to play back the selected program according to the selected program identifier information 10 by, for example, skipping over any intermediate channel changes recorded in the memory.

Figure 3:
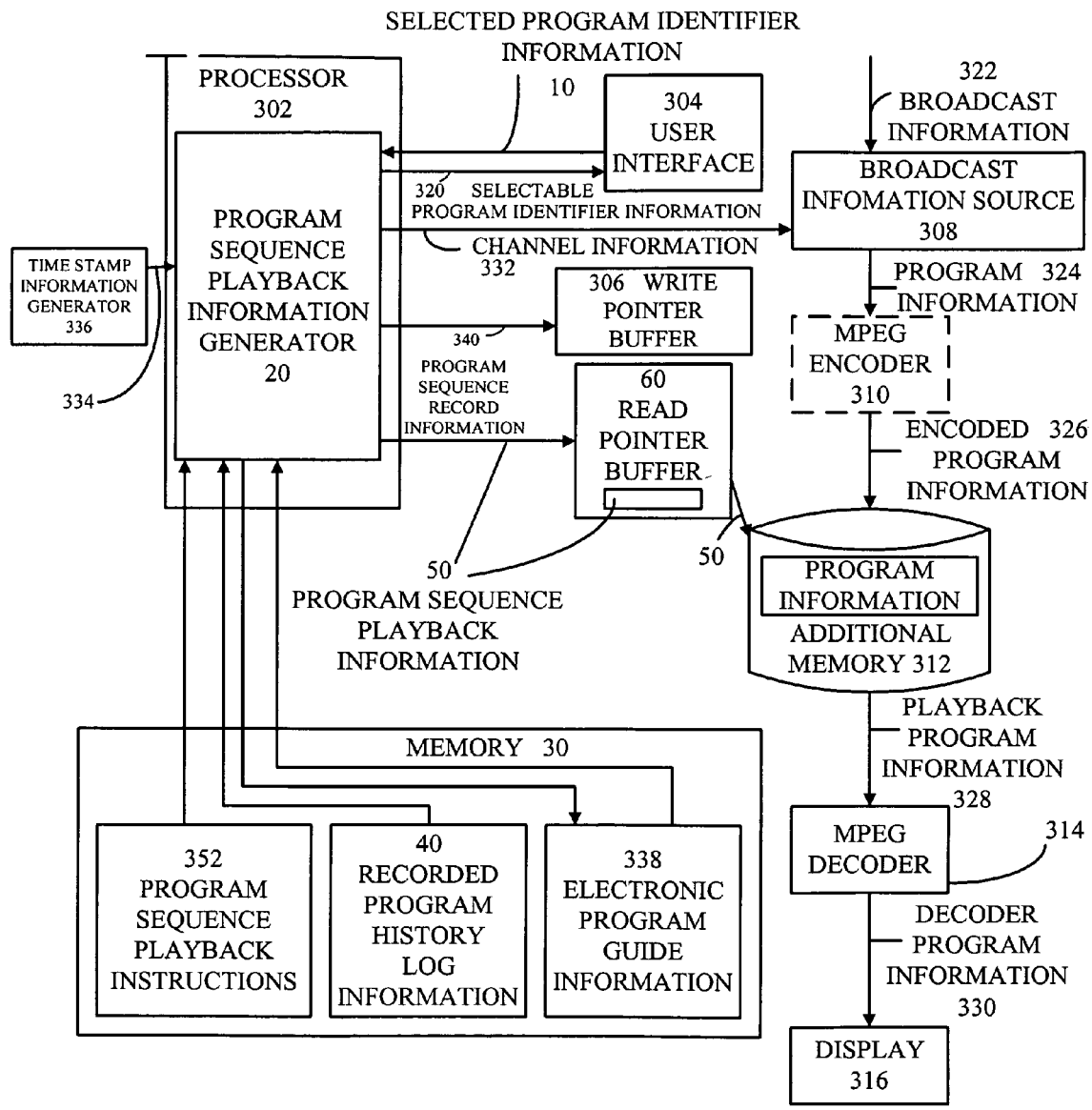
FIG. 3 is a block diagram of the program information player according to another embodiment of the invention.

FIG. 3 is a block diagram of a program information player 300 according to another embodiment of the invention. The program information player 300 includes a processor 302, a user interface 304, a write pointer buffer 306, a broadcast information source 308, an optional MPEG encoder 310, additional memory 312, an MPEG decoder 314, a display 316 and a timestamp generator 336. The broadcast information 322 may include audio and video information modulated on a suitable carrier frequency as is known in the art. Alternatively, the broadcast information 322 may include audio and/or video information such as composite or component video information and stereo audio information such as S-video information, optical audio and video information or any other suitable encoded or decoded audio and/or video information in a digital and/or analog format. Memory 30 includes program sequence playback instructions 352.

The broadcast information source 308, such as a cable box, a set top tuner, an analog tuner, a digital tuner, a DVD player, a video recorder, the Internet, a video server, a computer or any suitable source, receives broadcast information 322 and, in response, generates program information 324. The optional MPEG encoder 310 is shown for receiving the program information 324 and for generating encoded program information 326, depending on the format of the broadcast information 322 and the format of the encoded program information 326 received by the additional memory 312, and therefore the optional MPEG encoder 310 may not be necessary. Similarly, the MPEG decoder 314 shown receiving playback program information 328 and generating decoded program information 330 may be optional as well. According to one embodiment, the additional memory 312 may therefore receive program information 324. According to this embodiment, the program information 324 may include audio and/or video information such as composite or component video information and stereo audio information such as S-video information, optical audio and video information or any other suitable encoded or decoded audio and/or video information in a digital and/or analog format. Further, the program information 324 herein also includes any reference to any encoded type of program information 326 received for storage into additional memory 312.

According to one embodiment, the additional memory 312 receives the program information 324, the encoded program information 326 as described above, or any suitable information for storage, as is known to be performed in digital video recorders. As program information 324 is stored in additional memory 312, the program sequence playback information generator 20 updates the recorded program history log information 40 with, for example, channel information 332 and time stamp information 334 from time stamp information generator 336. As a result, the additional memory 312 may provide playback program information 328 according to program sequence playback information 50 for display on display 316.

Figure 4:
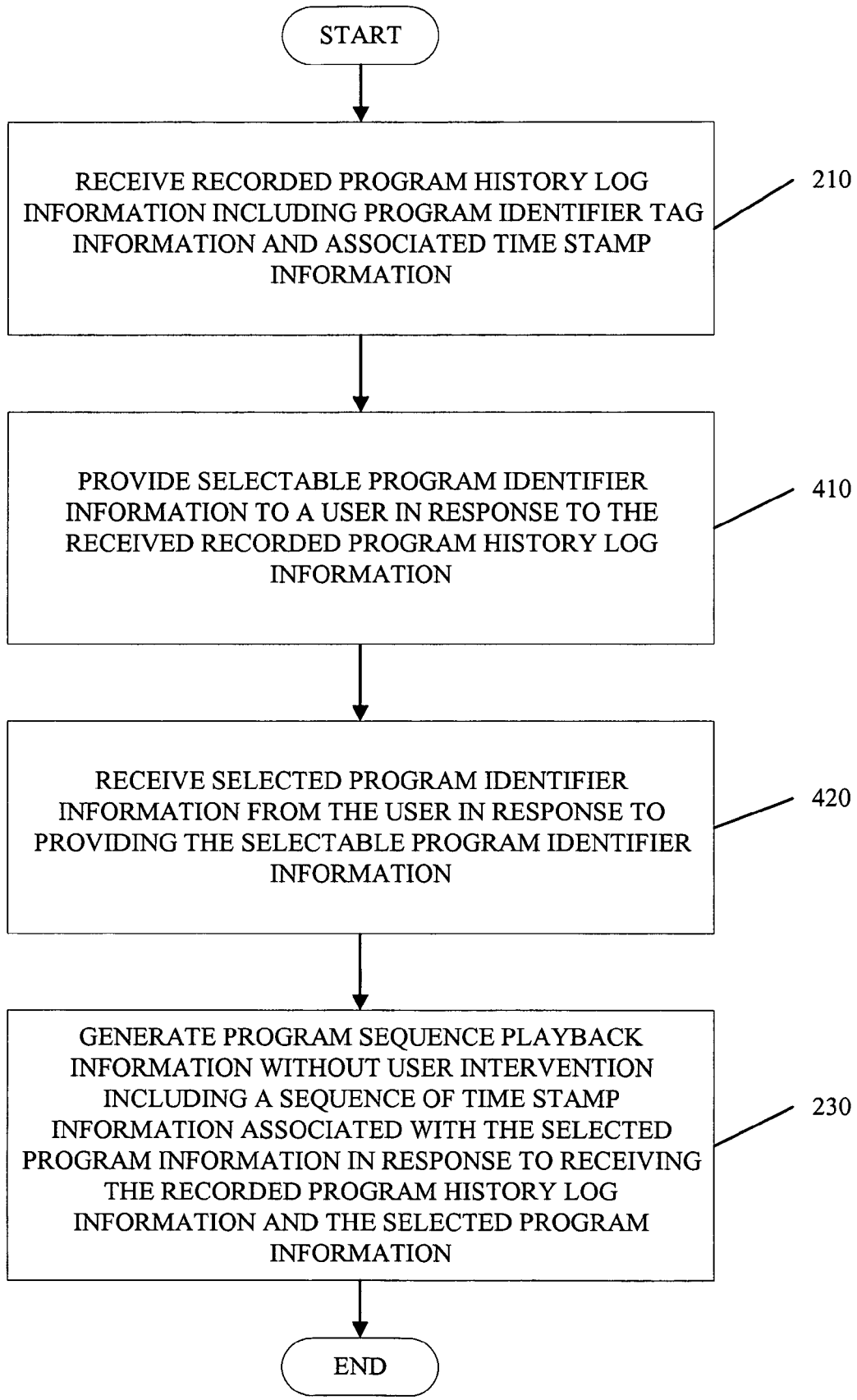
FIG. 4 is a flowchart illustrating another example of a method for the programming of program information in accordance with another exemplary embodiment of the invention.

FIG. 4 illustrates a method for the programming of program information according to one embodiment of the invention. The method may be carried out by the program information player 100, 300 or more specifically by program sequence playback information generator 20; however, any other suitable structure may also be used. It will be recognized that the method beginning with step 210 will be described as a series of operations, but the operations may be performed in any suitable order and may be repeated in any suitable combination.

As shown in step 410, the program sequence playback information generator 20 provides selectable program identifier information 320 to a user via the user interface 304 in response to the received recorded program history log information 40. For example, the program sequence playback information generator 20 may review the titles of the programs stored in the recorded program history log information 40 and provide a listing of selectable programs via, for example, via pull-down menu. The selectable program identifier information 320 may correspond to the titles of shows that were previously indicated in the recorded program history log information 40.

As shown in step 420, the program sequence playback information generator 20 receives the selected program identifier information 10 from the user via the user interface 304 in response to providing the selectable program identifier information 320. For example, the user may select one or more of programs from the selectable program identifier information 320 to produce the selected program identifier information 10.

As shown in FIG. 5, the recorded program history log information 40 includes the name of a program, the title of a program or any suitable descriptor, such as a category as program identifier tag information 510 and channel information 520. The recorded program history log information 40 includes associated time stamp information 530, which may relate to the start date and time and the duration of the program. The program sequence playback information 50 includes similar information. The recorded program history log information 40 may be based on channel information 332.

According to one embodiment of the invention, the program sequence playback information generator 20 receives electronic program guide information 338 from memory 30. The electronic program guide information 338 as previously stated may include, among other things, program tag information corresponding to, for example, a name, title or category of a program; channel information, that may correspond to a broadcast channel, such as CNN, ABC or MTV; and corresponding broadcast time information. According to this embodiment, the program sequence playback information generator 20 generates matching program information when the received selected program identifier information 10 corresponds with the scheduled program tag information 510 in the electronic program guide information 338. As a result, the program sequence playback information generator 20 generates the program sequence playback information 50 corresponding to portions of the received selected program identifier information 10 identified in the scheduled program tag information 510 in the electronic program guide information 338 but not identified in the program identifier tag information 510 in the program history log information 40. Advantageously, the program sequence playback information generator 20 merely records any missing portions of a program as a result of any prior channel changes. Therefore, the additional memory 312 is not required to record any redundant program or portions of the program information 324 and therefore minimizes storage waste. The program sequence playback information generator 20 generates the program sequence playback information 50 so that the desired program is played back on display 316 without interruption to the user, since a sequence of playback is automatically determined by the program sequence playback information generator 20.

According to another embodiment, the program sequence playback information generator 20 causes the additional memory 312 to receive the program information 324 corresponding to the scheduled program identifier tag information 50, channel information 520 and corresponding broadcast time information when the received selected program information 324 corresponds to the scheduled program identifier tag information in the electronic program guide information 338. According to this embodiment, the additional memory 312 records the entire program identified by the selected program identifier information 10. According to one embodiment, the program sequence playback information generator 20 generates the program sequence record information 340 to cause the additional memory 312 to delete the stored program information corresponding to portions of the received selected program identifier information 10 previously identified in the scheduled program identifier tag information 510 of the electronic program guide information 338 and also identified in the program identifier tag information 510 in the recorded program history log information 40. As a result, any redundant portions of the selected program that were already stored in the additional memory 312 may be deleted in order to avoid unnecessary and wasteful storage of redundant portions of a program.

The program sequence playback information generator 20 may construct the program sequence playback information 50 concurrently with the received selected program identifier information 10 and while the additional memory 312 stores the program information 324 or the encoded program information 326. For example, the user may provide the selected program identifier information 10 to program the program sequence playback information generator 20 to record a selected program in the future. Alternatively, the program sequence playback information generator 20 may generate the program sequence playback information 50 after the additional memory 312 has stored the program information 324 or the encoded program information 326 and the selected program has ended. For example, the user may provide the selected program identifier information 10 to the program sequence playback information generator 20 to identify a previously recorded program as a selected program for playback as previously described. Accordingly, the program sequence playback information generator 20 may generate the program sequence playback information 50 at any time relative to receiving the broadcast information 322 or the program information 324.

Among other advantages, the program information player 100, 300 automatically identifies any intermediate channel changes while recording a selected program. For example, the user may enter the selected program desired for playback. Alternatively, the user may select from a list of programs recorded based on the first segment in the list of recorded programs or based on the segment with the most recording time. In response to receiving the selected program from the user, the program information player 100, 300 plays back a previously recorded program corresponding to the selected program, without the intermediate channel changes originally recorded. Accordingly, a user playing back a previously recorded program may be able to enjoy the selected program without the intermediate channel changes originally recorded. As a result, the user does not have to manually fast-forward over the intermediate channel changes during playback, since the program information player 100, 300 automatically identifies the intermediate channel changes and resumes playback when recording returns to the selected program. According to another embodiment, the program information player 100, 300 may identify a scheduled replay or rerun of the selected program in order to record any portions of the selected program that were missed as a result of the user's changing channels during the recording of the selected program. Accordingly, the user may enjoy the playback of the selected program without having to search a TV listing such as an electronic program guide for a rebroadcast or rerun of the selected program. Further, the program information player 100, 300 can piece together segments of the same selected program aired at different times. Therefore, the user does not need to wait until the selected program airs again, nor is the user required to manually try to find the individual segments of the previously recorded program.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

The invention claimed is:

1. A method for programming program video information comprising:

receiving recorded program history log information that identifies channel changes during recording of a program on a channel of interest, including program identifier tag information and associated time stamp information;

providing selectable program identifier information to a user in response to the received recorded program history log information;

receiving selected program identifier information from the user in response to providing the selectable program identifier information;

generating program sequence playback information without user intervention, including a sequence of time stamp information associated with the selected program identifier information in response to receiving the recorded program history log information and the selected program identifier information; and playing back a program based on the selected program identification information without playing back program information from intermediate channel changes.

2. The method of claim 1, including:

receiving electronic program guide information, including at least scheduled program tag information, channel information and corresponding broadcast time information;

generating matching program information when the received selected program information corresponds with the scheduled program tag information in the electronic program guide information;

generating program sequence record information corresponding to portions of the received selected program information identified in the scheduled program tag information in the electronic program guide but not identified in the program identifier tag information in the program history log information;

receiving program identifier information; and storing the received program information corresponding to the program sequence record information.

3. The method of claim 1, including:

receiving electronic program guide information including at least scheduled program tag information, channel information and corresponding broadcast time information; and storing the received program information corresponding to the scheduled program tag information, channel information and corresponding broadcast time information when the received selected program identifier information corresponds with the scheduled program information.

4. The method of claim 3, including:

receiving program information;

storing the received program information corresponding to the program sequence record information; and deleting the stored program information corresponding to portions of the received selected program identifier information identified in the scheduled program tag information in the electronic program guide and also identified in the program identifier tag information in the program history log information.

5. A program information player comprising:

a program sequence playback information generator operative to:

receive recorded program history log information, including program identifier tag information and associated time stamp information that identifies channel changes during recording of a program on a channel of interest;

receive selected program identifier information;

generate program sequence playback information without user intervention, including a sequence of time stamp information associated with the selected program information in response to receiving the recorded program history log information and the selected program identifier information; and playing back a program based on the selected program identification information without playing back program information from intermediate channel changes.

6. The program information player of claim 5, including:

memory, operatively coupled to the program sequence playback information generator, wherein the memory is operative to store the recorded program history log information, wherein the program sequence playback information generator is operative to:

receive program identifier information;

store the received program information in the memory; and update the recorded program history log information stored in the memory in response to storing the received program information;

wherein the memory is operative to generate playback program information according to the program sequence playback information.

7. The program information player of claim 5, wherein the program sequence playback information generator is operative to:

receive electronic program guide information including at least scheduled program tag information, channel information and corresponding broadcast time information;

generate matching program information when the received selected program identifier information corresponds with the scheduled program tag information in the electronic program guide information; and generate program sequence record information corresponding to portions of the received selected program identifier information identified in the scheduled program tag information in the electronic program guide information but not identified in the program identifier tag information in the program history log information.

8. The program information player of claim 7, wherein the program sequence playback information generator is operative to:

generate program sequence playback information corresponding to the program identifier tag information in the program history log information and the generated program sequence record information; and generate playback program information according to the program sequence playback information.

9. The program identifier information player of claim 5, wherein the program sequence playback information generator is operative to:

receive electronic program guide information including at least scheduled program tag information, channel information and corresponding broadcast time information; and store the received program information corresponding to the scheduled program tag information, channel information and corresponding broadcast time information when the received selected program identifier information corresponds to the scheduled program tag information.

10. The program information player of claim 9, wherein the program sequence playback information generator is operative to:

receive program information;

store the received program information corresponding to the program sequence record information;

delete the stored program information corresponding to portions of the received selected program information identified in the scheduled program tag information of the electronic program guide information and also identified in the program identifier tag information in the recorded program history log information.

11. A program information player comprising:

a program sequence playback information generator operative to:

receive program identifier information;

receive recorded program history log information including program identifier tag information and associated time stamp information that identifies channel changes during recording of a program on a channel of interest;

provide selectable program identifier information to a user in response to the received recorded program history log information;

receive selected program identifier information; and generate program sequence playback information without user intervention, including a sequence of time stamp information associated with the selected program identifier information in response to receiving the recorded program history log information and the selected program identifier information;

memory, operatively coupled to the program sequence playback information generator, wherein the memory is operative to:

store the received program information in the memory;

update recorded program history log information stored in the memory in response to storing the received program information; and generate playback program information according to the program sequence playback information that does not include program information from intermediate channel changes.

12. The program information player of claim 11, wherein the program sequence playback information generator is operative to:
- receive electronic program guide information, including at least scheduled program tag information, channel information and corresponding broadcast time information;
- generate matching program information when the received selected program identifier information corresponds to the scheduled program tag information in the electronic program guide information; and
- generate program sequence record information corresponding to portions of the received selected program identifier information identified in the scheduled program tag information in the electronic program guide but not identified in the program identifier tag information in the program history log information.

13. The program information player of claim 12, wherein the program sequence playback information generator is operative to:
- generate program sequence playback information corresponding to the program identifier tag information in the program history log information and the generated program sequence record information; and
- generate playback program information according to the program sequence playback information.

14. The program information player of claim 11, wherein the program sequence playback information generator is operative to:
- receive electronic program guide information including at least scheduled program tag information, channel information and corresponding broadcast time information; and
- store the received program information corresponding to the scheduled program tag information, channel information and corresponding broadcast time information when the received selected program identifier information corresponds with the scheduled program information.

* * * * *